United States Patent
Oswald et al.

(10) Patent No.: US 8,291,421 B2
(45) Date of Patent: Oct. 16, 2012

(54) IDLE TASK MONITOR

(75) Inventors: Tommy Lee Oswald, Tigard, OR (US);
John C. Thomas, Portland, OR (US);
James E. Owen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 992 days.

(21) Appl. No.: 12/273,888

(22) Filed: Nov. 19, 2008

(65) Prior Publication Data

US 2010/0125849 A1    May 20, 2010

(51) Int. Cl.
*G06F 9/46*    (2006.01)
*G06F 9/48*    (2006.01)

(52) U.S. Cl. ......... 718/103; 718/102; 712/214; 712/229

(58) Field of Classification Search .................. 718/102, 718/103; 712/214, 216, 219, 228, 229
See application file for complete search history.

(56) References Cited

U.S. PATENT DOCUMENTS

| | | | | |
|---|---|---|---|---|
| 6,047,260 A * | 4/2000 | Levinson | ...................... | 705/7.15 |
| 6,105,141 A * | 8/2000 | Hanlon et al. | ................. | 713/323 |
| 6,360,243 B1 * | 3/2002 | Lindsley et al. | ............. | 718/103 |
| 6,381,580 B1 * | 4/2002 | Levinson | ...................... | 705/7.13 |
| 6,385,637 B1 * | 5/2002 | Peters et al. | .................. | 718/107 |
| 6,930,960 B2 * | 8/2005 | Miyake | ......................... | 368/113 |
| 7,260,068 B2 * | 8/2007 | Hsieh et al. | .................... | 370/311 |
| 7,296,137 B2 * | 11/2007 | Moyer | ......................... | 711/205 |
| 7,577,114 B2 * | 8/2009 | Hsieh et al. | .................... | 370/311 |
| 7,913,256 B2 * | 3/2011 | Torii et al. | ...................... | 718/102 |
| 7,949,888 B2 * | 5/2011 | Cox et al. | ....................... | 713/323 |
| 7,949,889 B2 * | 5/2011 | Sotomayor et al. | ........... | 713/323 |
| 8,082,231 B1 * | 12/2011 | McDaniel et al. | ............. | 707/681 |
| 2007/0031801 A1 * | 2/2007 | Tidwell-Scheuring et al. | ............................. | 434/322 |
| 2007/0240163 A1 * | 10/2007 | Conrad et al. | ................ | 718/107 |
| 2009/0288092 A1 * | 11/2009 | Yamaoka | ...................... | 718/104 |

* cited by examiner

*Primary Examiner* — Aimee Li
(74) *Attorney, Agent, or Firm* — Law Office of Gerald Maliszewski; Gerald Maliszewski

(57) ABSTRACT

A system and method are provided for determining processor usable idle time in a system employing a software instruction processor. The method establishes an idle task with a lowest processor priority for a processor executing application software instructions, and uses the processor to execute an idle task. The method ceases to execute the idle task in response to the processor executing application software instructions. The amount of periodic idle task execution is determined and stored in a tangible memory medium. For example, idle time amounts can be determined per a unit of time, i.e. a percentage per second. In one aspect, the method generates an idle task report. The report can be a periodic report expressing the duration of idle task execution per time period, or a course of execution report expressing idle task start times, idle task stop times, and durations between the corresponding start and stop times.

16 Claims, 4 Drawing Sheets

IDLE TASK MONITOR

BACKGROUND OF THE INVENTION

1. Field of the Invention

This invention generally relates to software execution of processes and, more particularly, to a system and method for accurately determining processor idle time on a periodic basis.

2. Description of the Related Art

A computer processor or microprocessor is "idle" when it is not executing instructions from a program or software application. Some low priority software programs are designed to be executed by a processor's central processing unit (CPU), so as to not impact programs which run at a normal priority. Programs that use CPU idle time cause the CPU to always be 100% utilized, so that the time spent where the CPU would have been idle is instead spent performing useful computations.

Most operating systems (OSs) display an idle task, which is a special task loaded by the OS scheduler only when there is nothing for the computer to do. The idle task can be hard-coded into the scheduler, or it can be implemented as a separate software application with the lowest possible priority. One advantage of using the idle task is that it can be monitored, to give an indication of processor usage. Windows NT's System Idle Process is an example.

In Windows NT operating systems, the System Idle Process is a kernel thread that runs when no other runnable thread can be scheduled on a CPU. For example, there may be no runnable thread in the system, or all runnable threads are already running on a different CPU. The System Idle Process is used by Windows NT to implement CPU power saving. The exact power saving scheme depends on the hardware and firmware capabilities of the system in question. For instance, with x86 processors, the process will run a loop of halt (HLP) instructions, which causes the CPU to turn off many internal components (saving power) and wait until an interrupt request (IRQ) arrives. On modern processors, where a HLT instruction saves significant amounts of power and heat, the idle task almost always consists of a loop which repeatedly executes HLT instructions.

The CPU time consumed by the System Idle Process is commonly of interest for end users, as it is a measure of the CPU utilization in their system, which is easily accessible through Windows' Task Manage program. There are, however, more detailed sources of such information available through Windows' performance monitoring system (accessible with the perfmon program), which includes more finely grained categorization of CPU time spending. A limited subset of the CPU time categorization is also accessible through the Task Manager, which can display CPU usage, categorized by time spent in user vs. kernel code. It should be noted, though, that that information is not calculated from information about the System Idle Process, but from the system's global performance counters.

When no other application is using the CPU processing power, the System Idle Process takes these CPU cycles. If the "CPU Time" column in Windows Task Manager is enabled, it can be seen that there is a continuous count—a measure of how long the computer has been switched on in the current session.

Thus, idle tasks are certainly not novel. They report the idle time of the processor given a particular time period. The problem is that the time period is not flexible. For example, in the context of a microprocessor-based printer, a print pipeline has several stages that must be undertaken before a print job can be successfully processed. The following is an example.

Host connects to the printer.
The printer makes a connection from the network application to the printer description language (PDL).
Intermediate buffers are filled.
The PDL starts to interpret the job.
As the PDL produces pages, each page needs to be rendered.
The rendered results need to be sent to the engine.

With this example, the prior art would represent the idle time for the entire print operation. An idle time report of 30% is meaningless for a programmer seeking to optimize a software program, because a simple percentage does not isolate where the idle time occurs in the print process. As a result, it is impossible to determine where optimization is required.

It would be advantageous if an idle task monitor existed that permitted idle time reports to be based upon periodic intervals, such as an idle time percentage per second.

It would be advantageous if the periodic idle time reporting could also be merged with milestones in the program to make optimization easier.

SUMMARY OF THE INVENTION

Described herein is a means of addressing some of the above-mentioned problems with idle task reporting. A system and method are presented for making idle reporting periods definable in two ways:

Periodic reports.
User definable periods of execution done through registration/deregistration.

Periodic reports give an idle time monitor the capability of reporting idle time periodically. By intermingling the idle time reports with messages from different stages (milestones) in a computer program, it becomes evident where the idle time is occurring. The reporting mechanism can be user datagram protocol (UDP) timers for example. The idle period can also be specified through a period of execution. This is done through registration/deregistration. Registration takes a snapshot of the idle information. Deregistration takes another snapshot of the idle information, calculates a percentage of idle time per second for the registration period, and issues a report.

Accordingly, a method is provided for determining processor usable idle time in a system employing a software instruction processor. The method establishes an idle task with a lowest processor priority for a processor executing application software instructions, and uses the processor to execute an idle task. The method ceases to execute the idle task in response to the processor executing application software instructions. The amount of periodic idle task execution is determined and stored in a tangible memory medium. For example, idle time amounts can be determined per a unit of time, i.e. a percentage per second.

In one aspect, the method generates an idle task report. The report can be a periodic report expressing the duration of idle task execution per time period, or a course of execution report expressing idle task start times, idle task stop times, and durations between the corresponding start and stop times.

Additional details of the above-described method and a system for determining processor usable idle time in a computer employing a software instruction processor are described below.

DETAILED DESCRIPTION

Figure 1:
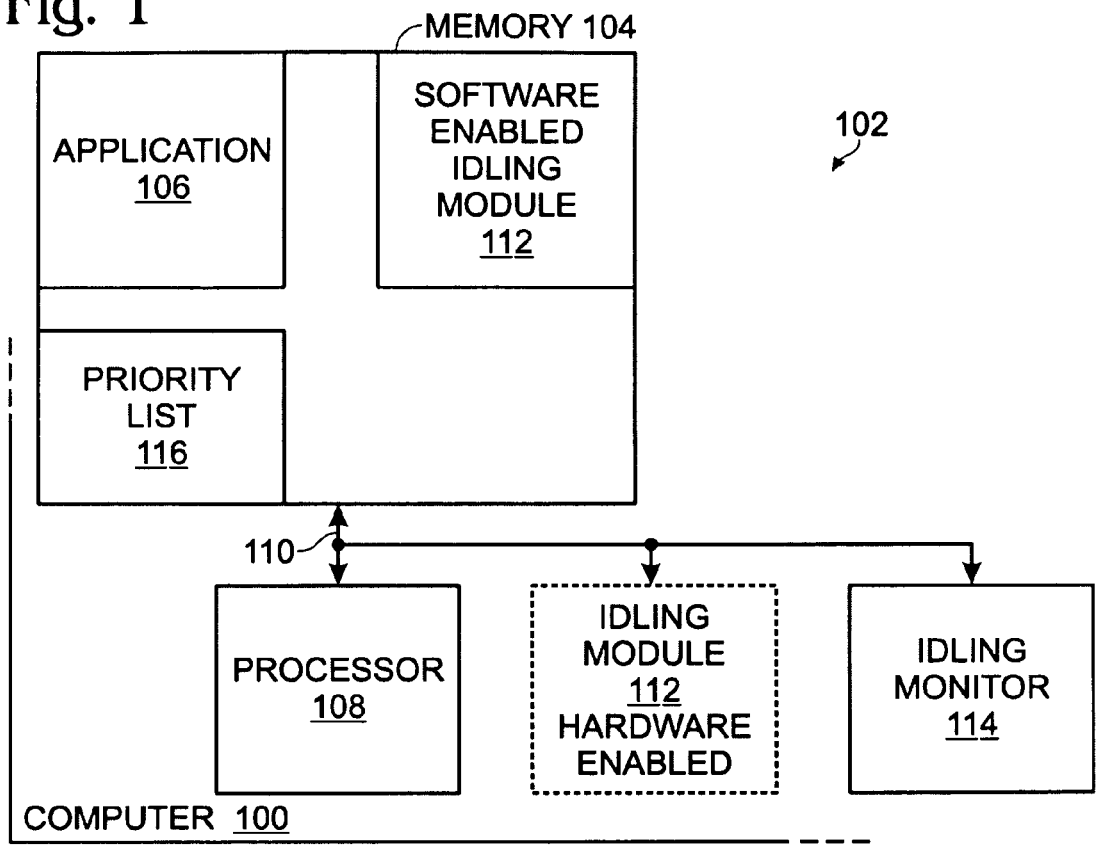
FIG. 1 is a schematic block diagram of a system for determining processor usable idle time in a computer employing a software instruction processor.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "processor", "processing device", "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

FIG. 1 is a schematic block diagram of a system for determining processor usable idle time in a computer 100 employing a software instruction processor. The system 102 comprises a memory 104 including at least one application 106 embodied as software instructions. A processor 108 has an interface on line 110 to fetch application software instructions from memory 104 and perform operations in response to the application software instructions. An idling module 112 has an interface connected to the processor on line 110 for supplying an idle task to execute when the processor is not executing application software instructions. The idling module 112 ceases to supply the idle task in response to the processor 108 executing application software instructions.

An idle monitor 114 has an interface connected to the idling module 112 on line 110 for determining periodic idle task execution and storing the idle task amounts in the memory 104. The idle monitor 114 may determines idle time amounts per a unit of time, i.e. the percentage of idle processor time per a unit of time.

In one aspect, the idling module 112 (shown in phantom lines) is enabled in hardware. In another aspect (shown), the idling module 112 is an application embodied as software instructions stored in the memory 104. The processor 108 accesses a list 116 of applications in memory organized by processing priority, with the idling module application being listed as the lowest priority application, and executes the idle task when it determines that the idling application has been granted processor time.

In another aspect, the idle monitor 114 accesses the idle task amounts stored in memory 104, and generates an idle task report. The idle task report may be a periodic report expressing the duration of idle task execution per time period, or a course of execution report expressing idle task start times, idle task stop times, and durations between the corresponding start and stop times.

For example, the memory includes first application software instructions 106. The processor 108 schedules the first application 106 of software instructions and executes the idle task when not executing the first application software instructions. The idle monitor 114 determines the amount of idle time in the total execution time of the first application 106 of software instructions. In one aspect, the idle monitor 114 generates an execution thread report including first application idle start times, first application idle stop times, and periodic idle time amounts between the start and stop times. In another aspect, the idle monitor 114 generates an execution thread report with job milestones and their corresponding start and stop times. A milestone might be related to the start or finish of a particular subroutine in an application.

Figure 2:
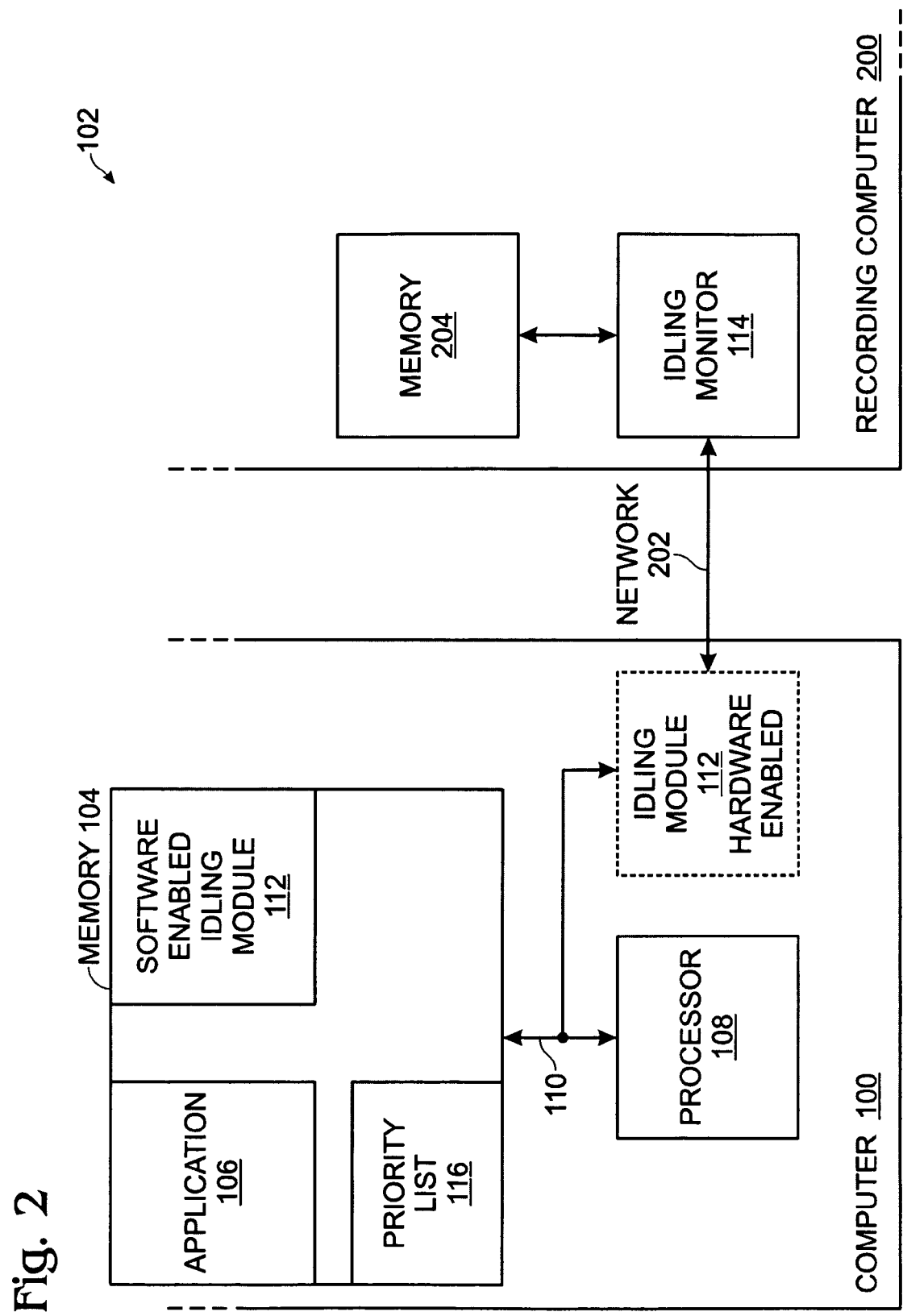
FIG. 2 is a schematic diagram depicting a variation of the system of FIG. 1.

FIG. 2 is a schematic diagram depicting a variation of the system of FIG. 1. In one aspect, the system 102 further comprises a recording computer 200 network-connected to the idling module 112 on line 202. The idle monitor 114 is embedded in the recording computer 200. The idle monitor 114 receives idle task amounts in messages from the idling module 112, and stores the idle task amounts in a recording computer memory 204.

Functional Description

Idle reporting periods are defined as periodic reports, or in user definable periods of execution done through registration and deregistration. By intermingling the idle time reports with messages (milestones) from different stages of a print pipeline of a processor-based printer, it can be determined where the idle time occurs. The reporting mechanism can be UDP Messages, for example.

Figure 3:
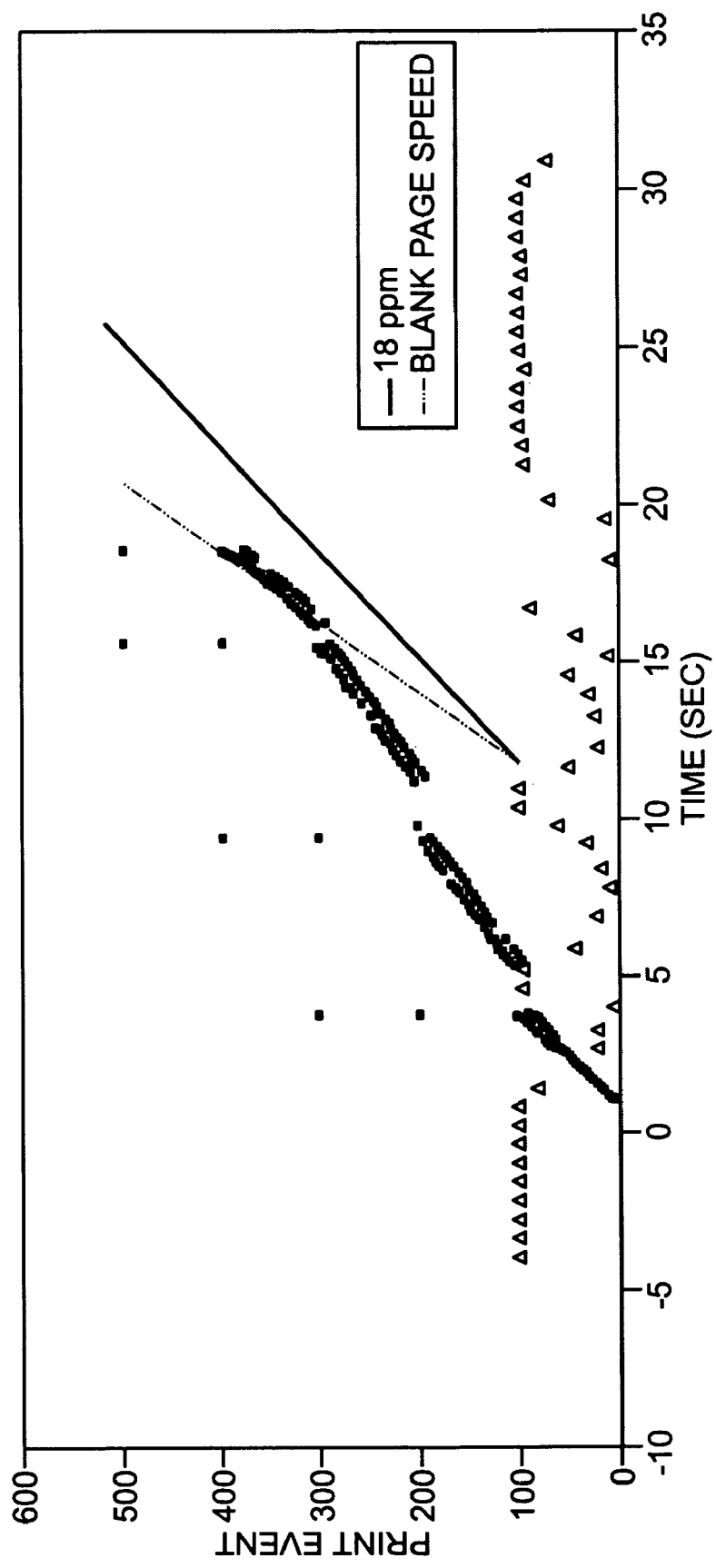
FIG. 3 is graph depicting a periodic idle time report for a print job.

FIG. 3 is graph depicting a periodic idle time report for a print job. The graph depicts how periodic idle time reports can be mingled with job processing events, to indicate where in an application the idle time occurs. This graph shows a representation of the print job events mingled with idle time reports. The square "box" marks are idle time reports. The "triangles" marks represent software code execution. If the "triangle" mark is on the "100" line, it shows that the processor was 100% idle, i.e., not doing anything. As the print job, i.e., 75_27489.pdf, is being processed, idle times vary and indicate where idle time is occurring during the processing of the print job. Note how the "triangle" idle time marks become lower when the "box" marks appear. The lower the "box" mark, the more efficiently was the processor utilized.

The idle monitoring system also provides a flexible way to specify the idle period through a period of execution. This is done through registration/deregistration. Registration takes a snapshot of the idle information. Deregistration takes another snapshot of the idle information, calculates a percentage of idle time per second for the registration period, and issues a report. The report can be by any means. In the context of the printer example, "printf" statements can be used to display the data to a console, or UDP Messages can be used. The registration periods can be of any duration and they can overlap.

Figure 4:
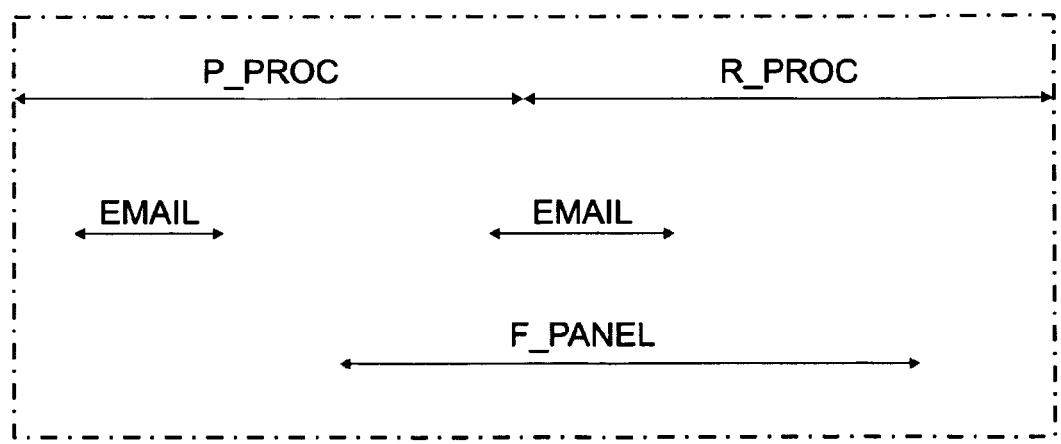
FIG. 4 is a graph depicting a course of execution report using multiple registrations.

FIG. 4 is a graph depicting a course of execution report using multiple registrations. Each double ended arrow represents a period of registration. The beginning of the arrowed line is where registration occurs. The end of the arrowed line is where deregistration occurs. As the graph depicts, registrations can overlap and represent any period of execution on multiple tasks which are running concurrently. It is even possible to implement a registration period for a single subroutine to understand how much idle time occurred during its execution. Shown are two course of execution reporting windows. A first window is identified as "P_PROC" and the second window as "R_PROC". In the first window it can be seen that a first idle period exists before the first EMAIL registration, and a second idle period exists between the deregistration of the first EMAIL and the registration of the front panel (F_PANEL). In the second widow a third idle period exists after the deregistration of the F_PANEL.

In one aspect, the OS can be used to monitor the processor and to provide an indication of when the processor is available to perform the idle task. In other aspect, the idle task does not rely on any real-time OS (RTOS) or OS services in order to do its job. Rather, the system may use an iteration counter and logic that continually calibrates the number of iterations which represent 100% idle. These numbers are stored in a sharable structure that allows real time access by routines which are exported for the rest of the system to call. The following represents the idle tasks sharable structure:

```
static struct idleCounters_t
{
    Uint32    count:      /* Number if iterations recorded during the last second */
    Uint32    idleDelta;   /* The number of iterations which represent 100% processor idle. */
    Uint32    lifeCnt1:/* Lower 32 bits of a lifetime iteration counter. This never resets. */
    Uint32    lifeCnt2:/* Upper 32 bits of a lifetime iteration counter. This never resets. */
} idleCounters = {0.0.0.0}:
```

The following represent exported routines which can be called by the rest of the system:
Configuration:
These are routines that effect periodic idle time reporting. They can be called directly from anywhere in the system. In addition, they can also be called from a debugging tool or via a printer job language (PJL) Parser. Configuration affects the following:
  Whether periodic reporting is enabled.
  Which type of report is enabled, i.e., brief or verbose. Verbose is used for debugging the idle task.
  Which method of reporting to use, i.e., UDP Messages or prints outs to a console.
  Changes the time period reports are generated. This is in seconds, with the minimum being 1 second. The default is 1 second.

Regardless of the configuration, calibration of the number of iterations that represent 100% idle time per second is continuous. When reports are generated, the idle task generates the report. This does effect idle time by consuming an insignificant percentage. Therefore, when reports are enabled, an idle time of almost 100% is possible. It should be understood that the invention is not limited to the above mention example, as the invention is not limited to any particular time period report default of calibration mode.

Registration/Deregistration

These routines allow for the definition of any processing period. At registration, a snapshot is made of the idle task's sharable structure. At deregistration, another snapshot of the idle task's sharable structure is taken. Together, the registration and deregistration snap shots of the sharable idle time structure provide all of the necessary information for a report about the percentage of idle time per second for the registration period. The two lifetime counters help to ensure that overflow will not occur more then once during the registration period of execution. Since the two lifetime counters are never reset, multiple and overlapping registration periods are allowed.

There are two ways to identify the general processes occurring while the idle time is being measured every second:
  1) Build the start and stopping of the periodic idle measurements into the code; and,
  2) Never stop the idle measurements, but add event measurements to the code. Then, post-process the measurements.

As an example: How much idle time was available during the printing of page 3?

| Time (secs) | Event |
|---|---|
| | Method 1: |
| 0 | Print job started |
| 3.5 | Page 3 started: turn on periodic idle measurements |
| 4.5 | Idle time/sec = 30% |
| 5.5 | Idle time/sec = 20% |
| 6.5 | Idle time/sec = 20% |
| 7.3 | Page 3 ended: turn off periodic idle measurements |
| | Method 2: |
| 0 | Print job started |
| 1.0 | Idle time/sec = 70% |
| 2.0 | Idle time/sec = 60% |
| 3.0 | Idle time/sec = 70% |
| 3.5 | Page 3 started: record "Page 3 Started" |
| 4.0 | Idle time/sec = 30% |
| 5.0 | Idle time/sec = 20% |
| 6.0 | Idle time/sec = 20% |
| 7.3 | Page 3 ended: record "Page 3 Ended" |

Figure 5:
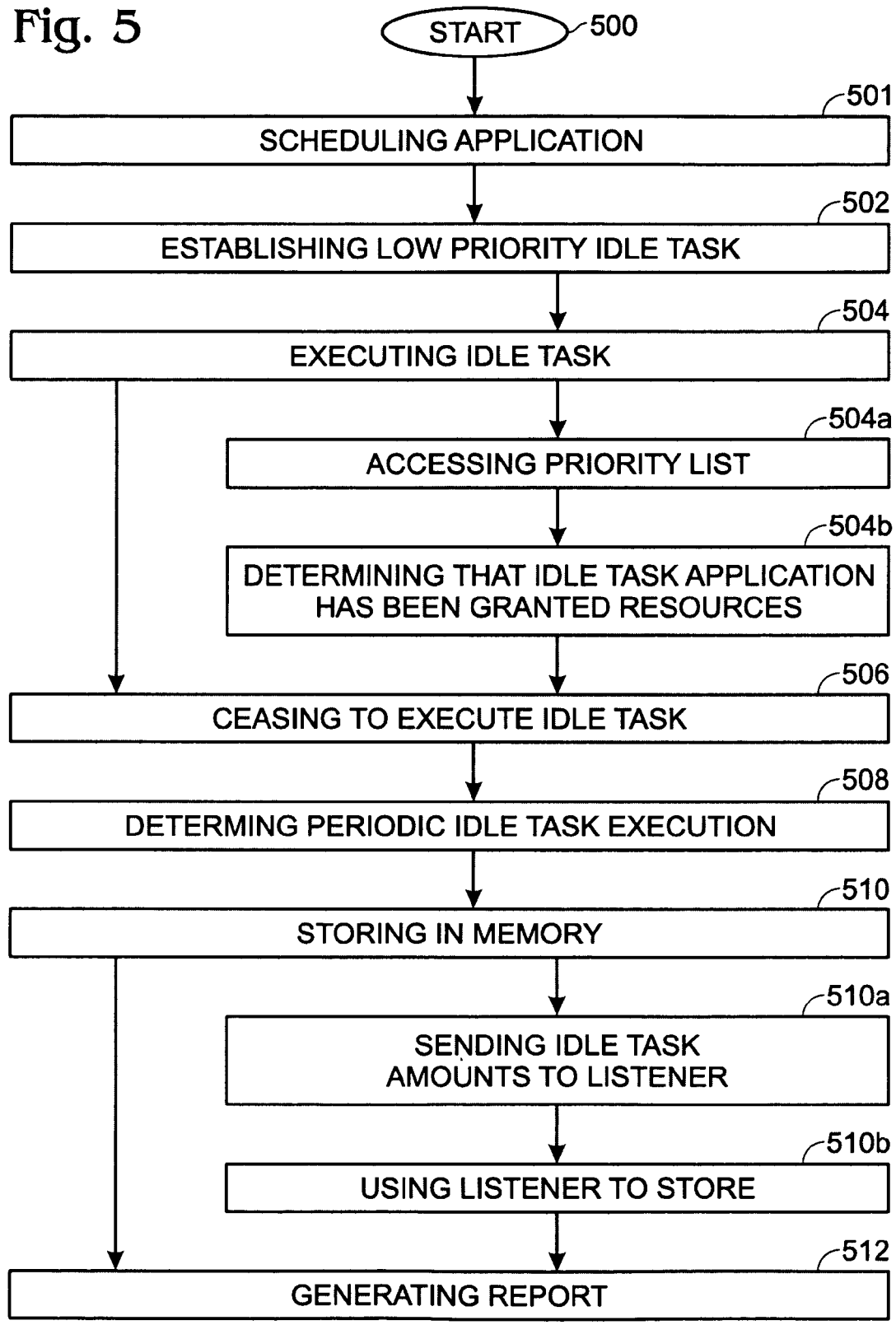
FIG. 5 is a flowchart illustrating a method for determining processor usable idle time in a system employing a software instruction processor.

FIG. 5 is a flowchart illustrating a method for determining processor usable idle time in a system employing a software instruction processor. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 500.

Step 502 establishes an idle task with a lowest processor priority for a processor executing application software instructions. Step 504 uses the processor to execute the idle task. Step 506 ceases to execute the idle task in response to the processor executing higher priority application software instructions. Step 508 determines periodic idle task execution. For example, idle time amounts per a unit of time can be determined. That is, the percentage of idle processor time per a unit of time can be determined. Step 510 stores the idle task amounts in a tangible memory medium.

In one aspect, using the processor to execute the idle task (Step 504) includes substeps. In Step 504a an OS accesses a list of applications organized by processing priority, with an idle task application being listed as the lowest priority application. In Step 504b the OS determines that the idle task application has been granted processor time.

In another aspect, Step 512 generates an idle task report in response to accessing the idle task amounts stored in memory. The idle task report can be a periodic report expressing the duration of idle task execution per time period, or a course of execution report expressing idle task start times, idle task stop times, and durations between the corresponding start and stop times.

For example, Step 501 may schedule a first application of software instructions with the OS. Using the processor to execute the idle task in Step 504 includes determining when the processor is not executing the first application software instructions. Then, determining periodic idle task execution in Step 508 includes determining the amount of idle time in the total execution time of the first application of software instructions. In one aspect, Step 512 generates an execution thread report including first application idle start times, first application idle stop times, and periodic idle time amounts between the start and stop times. The execution thread report may also include job milestones and their corresponding start and stop times.

In one aspect, storing the idle task amounts in the tangible memory medium (Step 510) includes substeps. Step 510a sends the idle task amounts in messages to a listener application installed in a network-connected recording computer. Step 510b uses the listener application to store the idle task amounts in a recording computer memory.

A system and method have been presented for determining processor useable idle time. Some examples of reports and monitoring algorithms have been presented to illustrate the invention. However, the invention is not limited to merely these examples. Other variations and embodiments of the invention will occur to those skilled in the art.

We claim:

1. In a system employing a software instruction processor, a method for determining processor usable idle time, the method comprising:
   scheduling a first application of software instructions with an operating system (OS);
   establishing an idle task with a lowest processor priority for a processor executing application software instructions;
   using the processor to execute the idle task;
   ceasing to execute the idle task in response to the processor executing higher priority application software instructions;
   determining periodic idle task execution;
   storing idle task amounts in a memory; and
   in response to the idle task amounts stored in the memory, generating an execution thread report including first application idle start times, first application idle stop times, periodic idle time amounts between the start and stop times, job milestones, and corresponding milestone start and stop times.

2. The method of claim 1 wherein using the processor to execute the idle task includes:
   the OS accessing a list of applications organized by processing priority, with an idle task application being listed as lowest priority application; and,
   the OS determining that the idle task application has been granted processor time.

3. The method of claim 1 wherein determining periodic idle task execution includes determining idle time amounts per a unit of time.

4. The method of claim 1 further comprising: in response to accessing the idle task amounts stored in memory, generating an idle task report for a plurality of applications.

5. The method of claim 4 wherein generating the idle task report includes generating an idle task report selected from a group consisting of a periodic report expressing the duration of idle task execution per time period and a course of execution report expressing idle task start times, idle task stop times, and durations between the corresponding start and stop times.

6. The method of claim 1 further comprising:
   wherein using the processor to execute the idle task includes determining when the processor is not executing the first application software instructions; and,
   wherein determining periodic idle task execution includes determining an amount of idle time in a total execution time of the first application of software instructions.

7. The method of claim 1 wherein determining periodic idle task execution includes determining a percentage of idle processor time per a unit of time.

8. The method of claim 1 wherein storing the idle task amounts in the tangible memory medium includes:
   sending the idle task amounts in messages to a listener application installed in a network-connected recording computer; and, using the listener application to store the idle task amounts in a recording computer memory.

9. In a computer employing a software instruction processor, a system for determining processor usable idle time, the system comprising:
   a memory including at least a first application embodied as software instructions;
   a processor having an interface to fetch application software instructions from memory and perform operations in response to the application software instructions;
   an idling module having an interface connected to the processor for supplying an idle task to execute when the processor is not executing application software instructions, and ceasing to supply the idle task in response to the processor executing application software instructions; and,
   an idle monitor having an interface connected to the idling module for determining periodic idle task execution and storing idle task amounts in the memory, the idle monitor, in response to the idle task amounts stored in the memory, generating an execution thread report including first application idle start times, first application idle stop times, periodic idle time amounts between the start and stop times, job milestones, and corresponding milestone start and stop times.

10. The system of claim 9 wherein the idling module is an application embodied as software instructions stored in the memory; and,
   wherein the processor accesses a list of applications in memory organized by processing priority, with the idling module application being listed as a lowest priority application, and executes the idle task when it determines that the idling module application has been granted processor time.

11. The system of claim 9 wherein the idle monitor determines idle time amounts per a unit of time.

12. The system of claim 9 wherein the idle monitor accesses the idle task amounts stored in memory, and generates an idle task report for a plurality of applications.

13. The system of claim 12 wherein the idle monitor generates an idle task report selected from a group consisting of a periodic report expressing the duration of idle task execution per time period and a course of execution report expressing idle task start times, idle task stop times, and durations between the corresponding start and stop times.

14. The system of claim 9 wherein the processor schedules the first application of software instructions and executes the idle task when not executing the first application software instructions; and,
   wherein the idle monitor determines an amount of idle time in a total execution time of the first application of software instructions.

15. The system of claim 9 wherein the idle monitor determines a percentage of idle processor time per a unit of time.

16. The system of claim 9 further comprising:
   a recording computer network-connected to the idling module; and,
   wherein the idle monitor is embedded in the recording computer, the idle monitor receiving idle task amounts in messages from the idling module, and storing the idle task amounts in a recording computer memory.

* * * * *